(12) United States Patent
Mori

(10) Patent No.: US 11,524,530 B2
(45) Date of Patent: *Dec. 13, 2022

(54) STUD PIN AND STUDDED TIRE

(71) Applicant: The Yokohama Rubber Co., LTD., Tokyo (JP)

(72) Inventor: Masakazu Mori, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 16/489,330

(22) PCT Filed: Feb. 28, 2017

(86) PCT No.: PCT/JP2017/007676
§ 371 (c)(1),
(2) Date: Aug. 27, 2019

(87) PCT Pub. No.: WO2018/158802
PCT Pub. Date: Sep. 7, 2018

(65) Prior Publication Data
US 2019/0381838 A1 Dec. 19, 2019

(51) Int. Cl.
*B60C 11/16* (2006.01)

(52) U.S. Cl.
CPC ...... *B60C 11/1668* (2013.01); *B60C 11/1643* (2013.01); *B60C 11/1656* (2013.01); *B60C 11/1675* (2013.01)

(58) Field of Classification Search
CPC ............ B60C 11/1625; B60C 11/1643; B60C 11/1656; B60C 11/1668
See application file for complete search history.

(56) References Cited

U.S. PATENT DOCUMENTS

| 2004/0163746 A1* | 8/2004 | Eromaki | B29D 30/66 |
| | | | 152/210 |
| 2017/0349006 A1 | 12/2017 | Matsumoto | |
| 2017/0368889 A1* | 12/2017 | Ajoviita | B60C 11/1675 |

FOREIGN PATENT DOCUMENTS

| CN | 101269613 | 9/2008 |
| FI | 123780 B1 * | 10/2013 |

(Continued)

OTHER PUBLICATIONS

Machine translation for Finland 123780 B1 (Year: 2021).*
International Search Report for International Application No. PCT/JP2017/007676 dated Jun. 6, 2017, 4 pages, Japan.

*Primary Examiner* — Steven D Maki
(74) *Attorney, Agent, or Firm* — Thorpe North & Western

(57) ABSTRACT

A stud pin includes a tip, a body portion, and a lower flange. A flange profile shape of the lower flange is an anisotropic shape includes short sides and long sides of different lengths, and includes four or more first flange protrusion portions that project in the longitudinal direction parallel with the long sides and two second flange protrusion portions that project in the lateral direction parallel with the short sides. A body profile shape of the body portion is a shape including body linear portions extending in a linear manner. The body linear portions are disposed facing a portion of the flange profile shape between two adjacent protrusion portions of the first flange protrusion portion and the second flange protrusion portion along the outer circumference of the flange profile shape.

11 Claims, 8 Drawing Sheets

(56) References Cited

FOREIGN PATENT DOCUMENTS

| | | |
|---|---|---|
| FI | 125983 B1 * | 5/2016 |
| JP | S63-242703 | 10/1988 |
| JP | 2016-097834 | 5/2016 |
| KR | 10-2009-0132896 | 12/2009 |
| KR | 10-2015-0071293 | 6/2015 |
| WO | WO 2014/027145 | 2/2014 |
| WO | WO 2016/098394 | 6/2016 |

* cited by examiner

STUD PIN AND STUDDED TIRE

TECHNICAL FIELD

The present technology relates to a stud pin mounted in a tire and a studded tire.

BACKGROUND ART

In the related art, studded tires for use on icy and snowy roads include stud pins installed in a tread portion and provide grip on icy road surface.

Typically, a stud pin is embedded in a pin inserting hole (hereinafter, also referred to as simply "hole") provided in the tread portion. When a stud pin is embedded in a hole, the hole expands in diameter. By inserting the stud pin into the hole in this state, the stud pin is firmly fastened in the hole and the tread portion and mounted in the tread portion. As a result, the stud pin is prevented from falling out from the hole due to receiving breaking or accelerating forces or lateral forces from the road surface when the studded tire rolls. By preventing the stud pin from falling out, braking and driving properties and controllability on icy road surfaces are ensured.

To increase the braking and driving properties and the controllability on icy road surfaces, the profile shape of an upper flange or a lower flange of the stud pin has been given a non-arc shape.

For example, a known stud pin includes a lower flange with a profile shape that includes protrusion portions projecting in an arc shape in opposite directions and curved portions recessed in an arc shape in an orthogonal direction orthogonal to the projection direction of the protrusion portions, wherein the stud pin is anisotropic in that the length of the profile shape in the projection direction of the protrusion portion is longer than the length of the profile shape in the orthogonal direction.

Since the profile shape of the lower flange of the stud pin is an anisotropic shape with a non-arc shape, the stud pin needs to be oriented with respect to the tire and inserted into the hole. The insertion of stud pins is typically performed using a stud pin installation device provided with installing fingers. However, the stud pins including the lower flange with an anisotropic shape are difficult for the installing fingers to grip and stabilize in a suitable orientation, and mistakes in installation occur easily.

SUMMARY

The present technology provides a stud pin that provides excellent braking and driving properties and controllability on icy road surfaces and has excellent pin installation properties and a studded tire installed with the stud pin.

Solution to Problem

An aspect of the present technology is a stud pin installable in a studdable tire, comprising:

a tip comprising an end surface that comes into contact with a road surface;

a body portion that supports the tip so that the tip projects from an end surface on one side of the body portion; and a lower flange connected to an end of the body portion on an opposite side to the end surface; wherein a flange profile shape of the lower flange as viewed from an arrangement direction of the tip, the body portion, and the lower flange is an anisotropic shape in which, of imaginary rectangles circumscribing the flange profile shape, a first smallest rectangle with a shortest side of its four sides being a smallest and/or a second smallest rectangle with a longest side of its four sides being a smallest comprise short sides and long sides of different lengths;

the flange profile shape comprises four or more first flange protrusion portions F1 that project toward a longitudinal direction parallel with the long sides and two second flange protrusion portions F2 that project toward a lateral direction parallel with the short sides;

a body profile shape of the body portion as viewed from the arrangement direction is a shape comprising body linear portions extending in a linear manner; and the body linear portions are disposed facing a portion of the flange profile shape along an outer circumference of the flange profile shape between two adjacent protrusion portions of the first flange protrusion portions F1 and the second flange protrusion portions F2.

Preferably, the first flange protrusion portions F1 are constituted by two pairs of the first flange protrusion portions F1; and the body profile shape comprises, as the body linear portions, two body linear portions B1 disposed facing a portion of the flange profile shape between each of the two pairs of the first flange protrusion portions F1 and four body linear portions B2 disposed facing a portion of the flange profile shape between each of the second flange protrusion portions F2 and one of the first flange protrusion portions F1.

Preferably, the flange profile shape comprises two first flange recess portions F3 curved toward a centroid of the flange profile shape and disposed between each of the pairs of the first flange protrusion portions F1 and four second flange recess portions F4 curved toward the centroid, disposed between each of the second flange protrusion portions F2 and one of the first flange protrusion portions F1, and smoothly connect to one of the first flange protrusion portions F1; and the body linear portions B1 are disposed facing the first flange recess portions F3, and the body linear portions B2 are disposed facing the second flange recess portions F4.

Preferably, the two second flange protrusion portions F2 comprise two flange linear portions parallel with the longitudinal direction; and the flange linear portions are portions projecting the most in the lateral direction.

Preferably, the body portion is encompassed within the flange profile shape when viewed from the arrangement direction;

the body profile shape comprises two body protrusion portions B4 projecting toward the second flange protrusion portions F2; and the body protrusion portions B4 each comprise two of the body linear portions B2 connected together.

Preferably, the body portion is encompassed within the flange profile shape when viewed from the arrangement direction;

the body profile shape comprises two body protrusion portions B3 projecting toward the short sides of the smallest rectangle;

the body protrusion portions B3 comprise the body linear portions B1; and the body linear portions B1 are portion projecting the most in a longitudinal direction parallel with the long sides of the smallest rectangle.

Another aspect of the present technology is a studded tire that is a studdable tire installed with a stud pin, comprising:

a tread portion installed with the stud pin described above with the longitudinal direction or the lateral direction facing a tire circumferential direction.

According to the present technology, a stud pin that provides excellent braking and driving properties and controllability on icy road surfaces and has excellent pin installation properties and a studded tire can be obtained.

DETAILED DESCRIPTION

Overall Description of Tire

Figure 1:
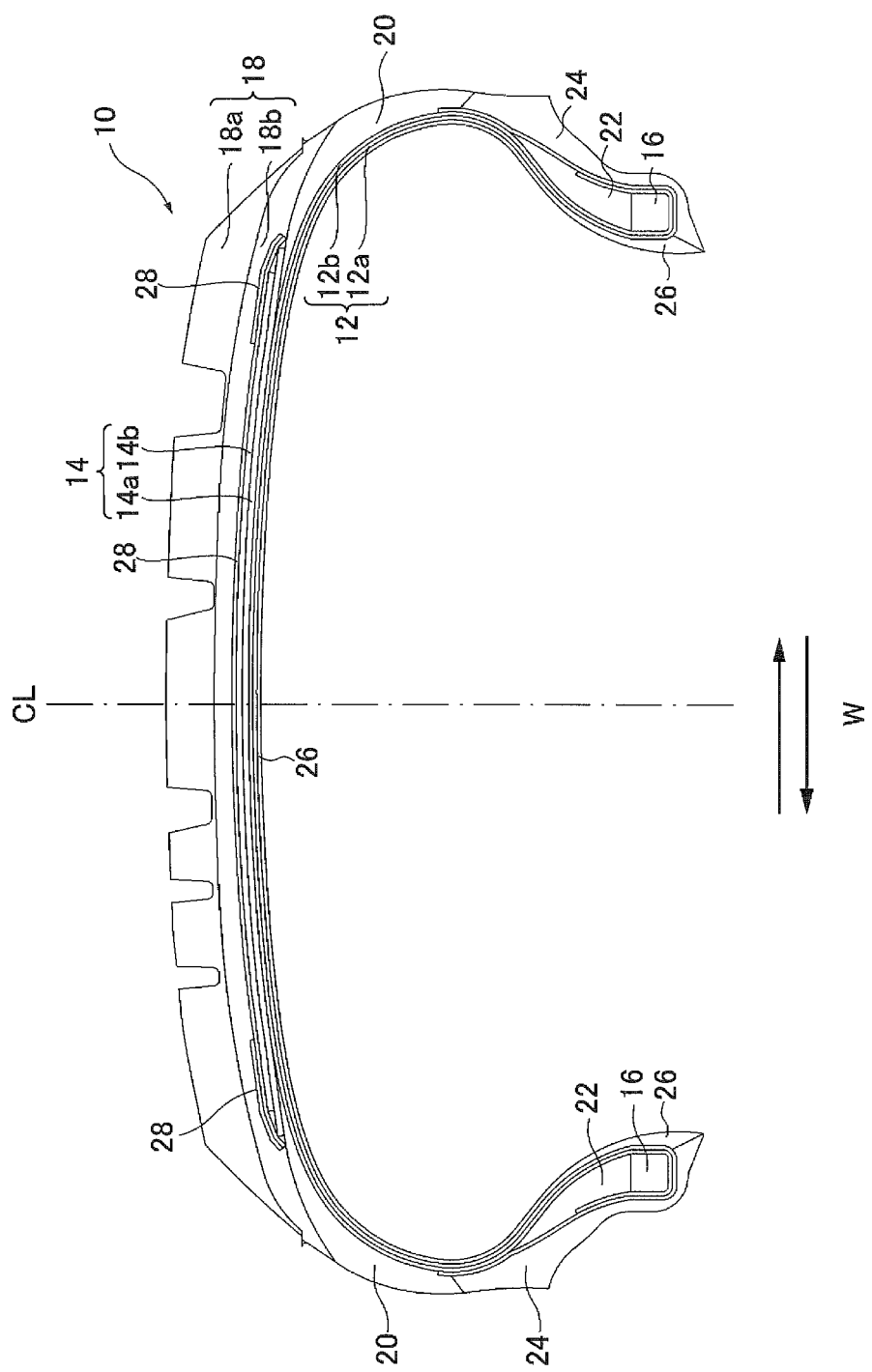
FIG. 1 is a tire cross-sectional view illustrating an example of a cross section of a tire of a present embodiment.
Figure 2:
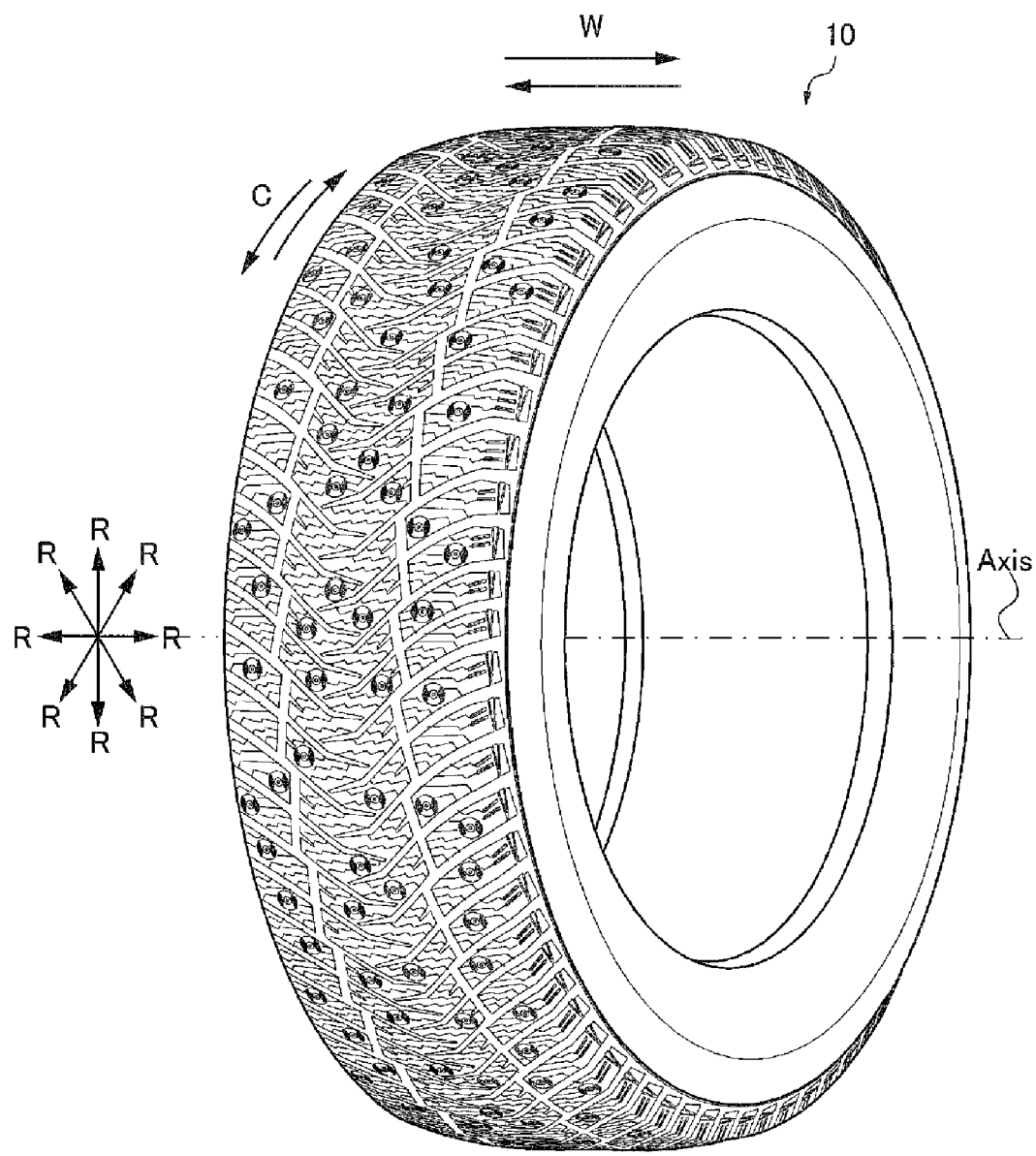
FIG. 2 is a perspective view of the tire of the present embodiment.

Hereinafter, a studded tire of the present embodiment is described. FIG. 1 is a tire cross-sectional view illustrating an example of a cross section of a studded tire (hereinafter also referred to as "tire") 10 of the present embodiment. FIG. 2 is a perspective view of the tire 10.

The tire 10 is a tire with stud pins embedded in a tread portion (the stud pins are not illustrated in FIGS. 1 and 2).

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire specified in Chapter C.

Values of the dimensions of various pattern elements are described in detail below as example values for a tire for a passenger vehicle. However, the studded tire is not limited to these example values.

"Tire circumferential direction C" described below (see FIG. 2) refers to the direction the tread surface rotates when the tire 10 rotates about a tire rotation axis Axis (see FIG. 2). "Tire radial direction R" refers to the direction that extends radially orthogonal to the tire rotation axis Axis. "Outward in the tire radial direction" refers to the direction away from the tire rotation axis Axis in the tire radial direction R. "Tire lateral direction W" refers to the direction parallel with the tire rotation axis Axis. "Outward in the tire lateral direction" refers to the direction away from a tire equator line CL (see FIG. 3) of the tire 10.

Tire Structure

The tire 10 includes a carcass ply 12, a belt 14, and bead cores 16 as framework members. The tire 10 also mainly includes a tread rubber 18, side rubbers 20, bead filler rubbers 22, rim cushion rubbers 24, and an innerliner rubber 26 around the framework members.

The carcass ply 12 includes carcass ply members 12a, 12b that are formed from organic fibers covered with rubber and that are wound between the pair of bead cores 16 of an annular shape so as to be formed into a toroidal shape. In the tire 10 illustrated in FIG. 1, the carcass ply 12 is made of the carcass ply members 12a and 12b but may also be made of a single carcass ply member. The belt 14 is provided outward of the carcass ply 12 in the tire radial direction and is constituted of two belt members 14a, 14b. The belt 14 is a member formed from steel cords covered with rubber, the steel cords being arranged inclined at a predetermined angle, for example, from 20 to 30 degrees, with respect to the tire circumferential direction C. The width in the tire lateral direction of the belt member 14a that is a lower layer is greater than the width of the belt member 14b that is the upper layer. The steel cords of the two layers of the belt members 14a and 14b are inclined from the tire circumferential direction C toward the tire lateral direction W in mutually different directions. As such, the belt members 14a, 14b are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form sidewall portions. The tread rubber 18 is made of two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction and come into contact with the rim on which the tire 10 is mounted. The bead filler rubbers 22 are provided outward of the bead cores 16 in the tire radial direction so as to be interposed between a portion of the carcass ply 12 before where it is wound around the bead cores 16 and a portion of the carcass ply 12 after where it is wound around the bead cores 16. The innerliner rubber 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt 14 from the outer side in the tire radial direction of the belt 14.

The tire 10 has such a tire structure, but the tire structure of the present embodiment is not limited to the tire structure illustrated in FIG. 1.

Tread Pattern

Figure 3:
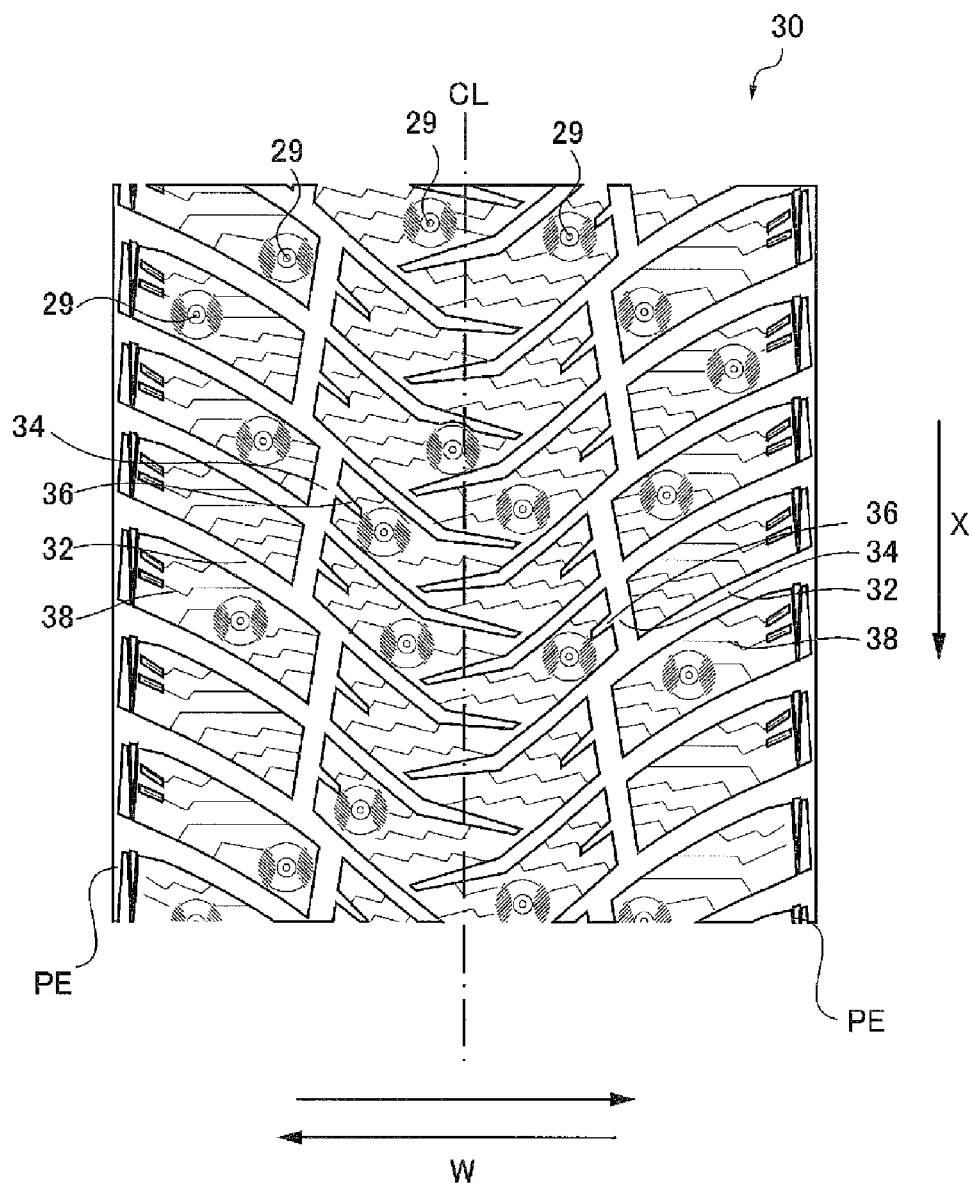
FIG. 3 is a developed plan view illustrating a portion of an example of a tread pattern of the studded tire of the present embodiment, developed on a plane.

FIG. 3 is a developed plan view illustrating a portion of an example of the tread pattern, namely a tread pattern 30, of the tire 10 developed on a plane. In FIG. 3, the stud pins installed in the tread portion are omitted from the illustration. As illustrated in FIG. 3, the tire 10 has a designated tire rotation direction X indicating a one-way direction along the tire circumferential direction C. Orientation information of the tire rotation direction X is shown by an information display portion including numbers, symbols, and the like (e.g., an arrow symbol) on the sidewall surface of the tire 10. The stud pins (see FIG. 4A) are installed in a plurality of pin inserting holes 29 illustrated in FIG. 3.

The tread pattern 30 includes an inclined groove 32, a circumferential direction communicating grove 34, a projecting groove 36, and a sipe 38.

A plurality of the inclined groove 32 are formed at predetermined intervals in the tire circumferential direction (vertical direction in FIG. 3).

The inclined groove 32 extends in a direction opposite (the up direction in FIG. 3) the tire rotation direction X (the down direction in FIG. 3) and outward in the tire lateral direction. The inclined groove 32 has a starting end at a position near the tire equator line CL on one side of the tire equator line CL in the tire lateral direction W, crosses the tire equator line CL and advances toward the other side in the tire lateral direction W, and ends at a pattern end PE.

The groove width of the inclined groove 32 gradually increases from the starting end near the tire equator line CL. The inclination with respect to the tire lateral direction W of the inclined groove 32 is smallest in a region near the tire equator line CL including the starting end and, after crossing the tire equator line CL, bends so as the inclination angle with respect to the tire lateral direction W increases, and advances outward in the tire lateral direction in a direction opposite the tire rotation direction X. Furthermore, the inclination angle gradually decreases with advancement outward in the tire lateral direction. The inclined grooves 32 configured as described above are provided on both sides of the tire equator line CL.

The inclined grooves 32 provided on one side of the tire equator line CL of the tread portion are offset with respect to the tire circumferential direction C from the inclined grooves 32 provided on the other side. The starting ends of the inclined grooves 32 on one side do not connect with the inclined grooves 32 provided on the other side.

Of the plurality of inclined grooves 32 provided in the tire circumferential direction C, the inclined grooves 32 that are adjacent are in communication via the circumferential direction communicating groove 34. More specifically, the circumferential direction communicating groove 34 extends in the tire circumferential direction C from a position partway along one of the inclined grooves 32, crosses a second inclined groove 32 that is adjacent to the first inclined groove 32 in the tire circumferential direction C, and advances to a third inclined groove 32 that is adjacent to the second inclined groove 32. That is, the circumferential direction communicating groove 34 starts at one of the inclined grooves 32 (first inclined groove 32), extends along the tire circumferential direction C from the first inclined groove 32 at which the circumferential direction communicating groove 34 starts, and terminates at a second inclined groove 32. In this way, the circumferential direction communicating groove 34 is provided so as to connect three of the inclined grooves 32 that are adjacent along the tire circumferential direction C. The circumferential direction communicating groove 34 is inclined with respect to the tire circumferential direction C so as to approach the tire equator line CL with advancement in the direction opposite to the tire rotation direction X.

The projecting groove 36 projects in a direction toward the tire equator line CL from the circumferential direction communicating groove 34, and is provided so as to terminate prior to reaching the tire equator line CL.

Land portions of the tread portion are separated into a center region and shoulder regions by the inclined grooves 32 and the circumferential direction communicating grooves 34. A plurality of the sipes 38 connected to the inclined grooves 32 and the circumferential direction communicating grooves 34 is provided in the center region and both of the shoulder regions of the tread portion.

Furthermore, the plurality of the pin inserting holes 29 is provided in the center region and both of the shoulder regions of the tread portion.

The inclined groove 32, the circumferential direction communicating groove 34, and the projecting groove 36 have a groove depth of, for example, from 8.5 mm to 10.5 mm, and a maximum groove width of 12 mm. The tread pattern illustrated in FIG. 3 is an example, and the tread pattern of the tire in which the stud pins of the present embodiment are installed in is not limited to the embodiment illustrated in FIG. 3.

Stud Pin

Figure 4A:
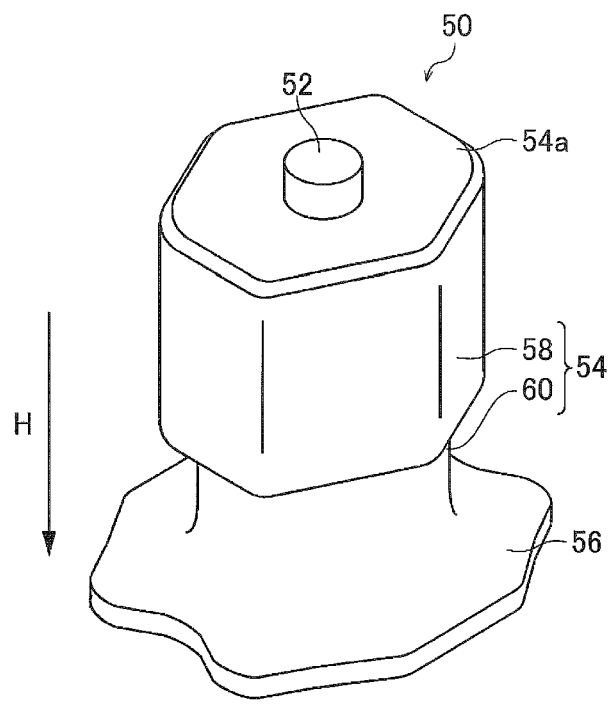
FIG. 4A is a perspective view of a stud pin of the present embodiment.
Figure 4B:
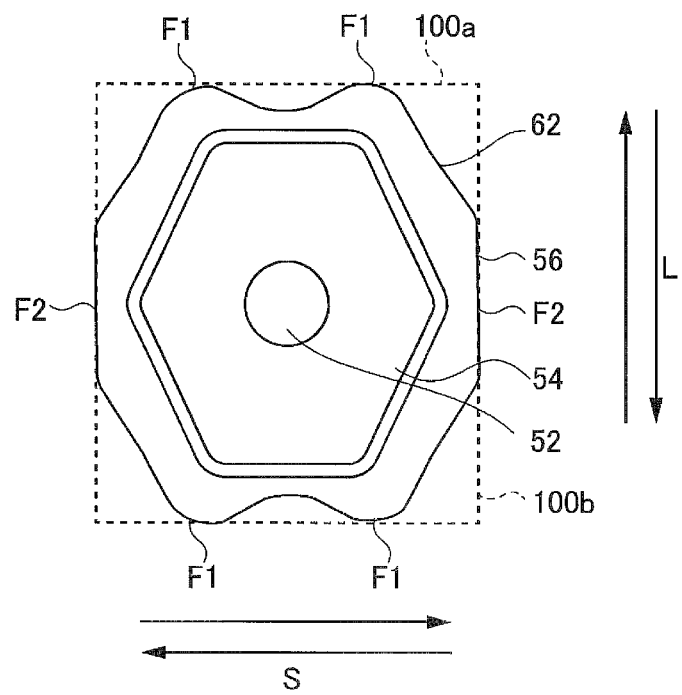
FIG. 4B is a plan view of the stud pin of the present embodiment.

FIG. 4A is a perspective view of a stud pin 50 of the present embodiment. FIG. 4B is a plan view of the stud pin 50 of the present embodiment.

The stud pin 50 includes a tip 52, a body portion 54, and a lower flange 56. The body portion 54 includes an upper flange 58 and a shank portion 60. When installed in the pin inserting holes 29 of the tire 10, the body portion 54 and the lower flange 56 are embedded in the tread rubber 18 (see FIG. 1) and are in contact with the tread rubber 18.

The tip 52 includes a tip end surface that comes into contact with a road surface. The tip 52 is formed from tungsten carbide or a similar hard metal. According to an embodiment, the tip 52 may be formed from a cermet material. The tip 52 is fixed in a hole provided in an upper end surface 54a of the body portion 54. The tip 52 of the stud pin 50 is configured to protrude from the tread surface when the stud pin 50 is installed in the tire 10.

The body portion 54 is a portion that supports the tip 52 with the tip 52 projecting from the upper end surface 54a on one side. The body portion 54 extends in the direction opposite to the projection direction of the tip 52. The extension direction of the body portion 54 is also the direction in which the tip 52, the body portion 54, and the lower flange 56 are arranged, and this direction is referred to as the H-direction.

The upper flange 58 of the body portion 54 is configured so that, when embedded in the tread portion of the tire 10, the tip 52 protrudes from the tread surface. The tip 52 is fixed on upper end surface 54a of the body portion 54.

The lower flange 56 is configured to come into contact with a bottom of the pin inserting hole 29, when embedded in the tread portion of the tire 10. The lower flange 56 is connected to the end of the shank portion 60 on the opposite side of the upper end surface 54a of the body portion 54.

The shank portion 60 is the portion that connects the upper flange 58 and the lower flange 56. The cross section of the shank portion 60 in the direction orthogonal to the H-direction is thinner than the cross sections of the upper flange 58 and the lower flange 56.

The material of the body 54 is not particularly limited but is preferably different from the material of the tip 52. According to an embodiment, the body portion 54 is formed from aluminum alloy or the like in order to reduce the weight of the stud pin 50.

In the present embodiment, as illustrated in FIG. 4B, the profile shape of the end surface of the tip 52 is circular when the tip 52 is viewed from the H-direction. According to an embodiment, the profile shape of the end surface of the tip 52 is preferably an elliptical shape, a curved line shape including a plurality of arc shapes, a convex polygonal shape, a concave polygonal shape, or a shape thereof with a portion changed to a linear shape, an arc shape forming a recess portion, or a wavy line shape with undulations.

In the present embodiment, as illustrated in FIG. 4B, the profile shape of the upper flange 58 (hereinafter, also referred to as "body profile shape") is a shape including a plurality of body linear portions that linearly extend, i.e., a plurality of linear sides, when the upper flange 58 is viewed from the H-direction. In the example illustrated in FIG. 4B, the body profile shape is a convex polygonal shape. In the example illustrated in FIG. 4, the body profile shape is a convex hexagonal shape. However, other preferred shapes include a convex octagonal shape, a convex dodecagonal shape, and other convex polygonal shapes. Additionally, according to an example, the body profile shape may be a concave polygonal shape instead of being a convex polygonal shape. The concave polygonal shape is a shape in which a plurality of convex polygons are connected so that one side of adjacent convex polygons is shared or that one of the vertex angles overlaps with each other.

According to an example, as illustrated in FIG. 4B, the profile shape of the upper flange 58 is preferably constituted only by body linear portions. However, according to an embodiment, the profile shape of the upper flange 58 is preferably a circular shape, an elliptical shape, or a curved line shape including a plurality of arc shapes with a portion changed to a linear shape or a convex polygonal shape or a concave polygonal shape with a portion changed to an arc shape forming a protrusion portion, an arc shape forming a recess portion, or a wavy line shape with undulations.

According to an example, as illustrated in FIG. 4B, the body profile shape is preferably an anisotropic shape with the length of the body profile shape in the longitudinal direction L and the length of the body profile shape in the lateral direction S being different from one another.

A flange profile shape 62 of the lower flange 56 is an anisotropic shape when the lower flange 56 is viewed from the H-direction. Here, as illustrated in FIG. 4B, the anisotropic shape is a shape in which, of imaginary rectangles circumscribed the flange profile shape 62 inclined in various directions, a first smallest rectangle with the shortest side of it four sides being the shortest and/or a second smallest rectangle with the longest side of its four sides being the shortest includes short sides and long sides of different lengths. In FIG. 4B, a first smallest rectangle is illustrated. In this example, the first smallest rectangle includes a side 100a corresponding to the shortest of the shortest sides. The first smallest rectangle also corresponds to the second smallest rectangle. In other words, the second smallest rectangle includes a side 100b corresponding to the shortest of the longest sides. The side 100a of the sides of the first smallest rectangle, which is also the second smallest rectangle, is a short side, and the side 100b is a long side. Accordingly, the flange profile shape 62 of the lower flange 56 is an anisotropic shape.

The flange profile shape 62 of the lower flange 56 with such an anisotropic shape includes four first flange protrusion portions F1 that project in the longitudinal direction L parallel with the long side (side 100b) and two second flange protrusion portions F2 that project in the lateral direction S parallel with the short side (side 100a). Hereinafter, the side 100b is referred to as "long side 100b", and the side 100a is referred to as "short side 100a".

Here, "first flange protrusion portion F1" means the portion formed in a protruding shape protruding in the longitudinal direction L located in a region separated in the longitudinal direction L a distance equal to or greater than half of the distance from a straight line parallel with the lateral direction S that goes through the center of the first smallest rectangle (the intersection point of two diagonal lines) to the short side 100a from the parallel straight line. "Protruding shape" refers to the shape of a portion that approaches the parallel straight line (a straight line parallel with the lateral direction S that extends through the center of the first smallest rectangle) as it extends outward on both sides to the outer circumference of the flange profile shape 62 from a point on the flange profile shape 62.

"Second flange protrusion portion F2" is the portion formed in a protruding shape protruding in the lateral direction S located in a region separated in the lateral direction S a distance equal to or greater than half of the distance from a straight line parallel with the longitudinal direction L that goes through the center of the first smallest rectangle (the intersection point of two diagonal lines) to the long side 100b from the parallel straight line. "Protruding shape" refers to the shape of a portion that approaches the parallel straight line (a straight line parallel with the longitudinal direction L that extends through the center of the first smallest rectangle) as it extends outward on both sides to the outer circumference of the flange profile shape 62 from a point on the flange profile shape 62.

In the present embodiment, the flange profile shape 62 of the lower flange 56 includes the four first flange protrusion portions F1 and the two second flange protrusion portions F2. Two of the first flange protrusion portions F1 face a first direction of the longitudinal direction L, and the other two first flange protrusion portions F1 face a second direction opposite to the first direction. One of the second flange protrusion portions F2 faces a third direction of the lateral direction S, and the other second flange protrusion portion F2 faces a fourth direction opposite to the third direction. The number of the first flange protrusion portions F1 facing the first direction in the longitudinal direction L is the same as the number of first flange protrusion portions F1 facing the second direction. According to an embodiment, preferably, three of the first flange protrusion portions F1 face the first direction of the longitudinal direction L and the other first flange protrusion portion F1 faces the second direction opposite to the first direction, and one of the second flange protrusion portions F2 faces a third direction of the lateral direction S and the other second flange protrusion portion F2 faces a fourth direction opposite to the third direction.

Additionally, according to an embodiment, the flange profile shape 62 of the lower flange 56 preferably includes five, six, or seven first flange protrusion portions F1 and two second flange protrusion portions F2. In this embodiment, the number of the first flange protrusion portions F1 facing the first direction in the longitudinal direction L may be the same as or different to the number of first flange protrusion portions F1 facing the second direction.

In the present embodiment, the body linear portions are disposed facing a portion of the flange profile shape between two adjacent protrusion portions of the first flange protrusion portion F1 and the second flange protrusion portion F2 along the outer circumference of the flange profile shape. Here, "body linear portions facing a portion of the flange profile shape between two adjacent protrusion portions (hereinafter, also referred to as "portion between protrusion portions") refers to an imaginary straight line connecting both ends of the portion between protrusion portions of the body linear portion extending in a direction inclined with respect to the longitudinal direction L (hereinafter, also referred to as "inclination direction"). In the case in which the portions between protrusion portions are first flange recess portions F3 or second flange recess portions F4 (described below), the ends of the portions between protrusion portions are ends of a recess portion. In the case in which the recess portions and the protrusion portions are arc shaped or have a shape including a plurality of arcs, the ends are set as follows. In other words, from the recess portion, partway as it extends toward the protrusion portions adjacent to the recess portion on both sides, the position of the boundary where the center of the radius of curvature shifts from outward of the flange profile shape to on or inward of the circumference of the flange profile shape corresponds to the ends of the recess portion. Furthermore, "the portion between protrusion portions of the body linear portion extending in the inclination direction" refers to the body linear portion extending at an incline with respect to the longitudinal direction L of a predetermined angular difference (for example, 15 degrees or less) with respect to the inclination direction of the portion between protrusion portions.

By providing the body linear portions facing the portions between protrusion portions in this manner, the installing fingers of a stud pin installation device used in installing the stud pin 50 into the pin inserting hole 29 can more easily support the upper flange 58 of the stud pin 50.

Figure 6:
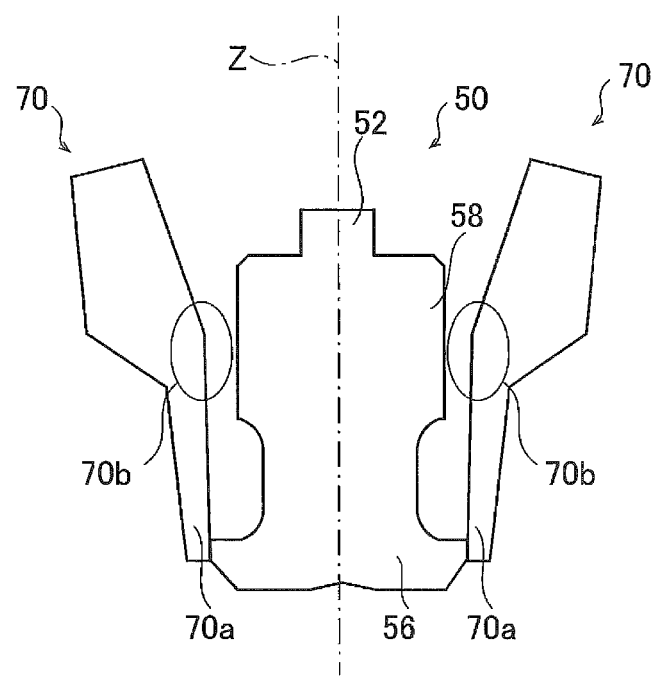
FIG. 6 is a diagram illustrating an example with the stud pin being gripped by installing fingers of a stud pin installation device according to an embodiment.

FIG. 6 illustrates an example with the stud pin 50 being gripped by the installing fingers of the stud pin installation device.

With installing fingers 70 gripping the lower flange 56, a center axis (an axis line extending through the centroid of the lower flange 56 or the body portion 54 and extending in the extension direction of the body portion 54) Z of the stud pin 50 may tilt. When end portions 70a of the installing fingers 70 grip the lower flange 56 and the stud pin 50 tilts, the upper flange 58 comes into contact with the portions 70b separated from the end portions 70a of the installing fingers 70 (the portions circled with an ellipse in FIG. 6, also referred to as "finger pad"). When the portion of the upper flange 58 in contact with the pad 70b of the installing finger 70 is a recess portion or a protrusion portion, the upper flange 58 can easily move sliding against the pad 70b of the installing finger 70, making the position of the stud pin 50 easily upset. When the position of the stud pin 50 is upset, it becomes difficult to arrange the stud pins 50 in a target orientation (in a direction around the center axis Z) and the possibility of stud pins 50 being installed in an incorrect orientation with respect to the tire is increased.

In the present embodiment, the body linear portions are provided facing the portions between protrusion portions of the lower flange 56 where it is easier for the installing fingers to grip. Thus, even when the stud pin 50 tilts and the upper flange 58 comes into contact with the pad of the installing finger, the upper flange 58 is suppressed from moving and sliding against the pad of the installing finger. This allows the stud pin 50 to be stability gripped. Thus, the stud pins 50 can be easily arranged in a target orientation and stud pins 50 can be installed in a correct orientation with respect to the tire.

Figure 5:
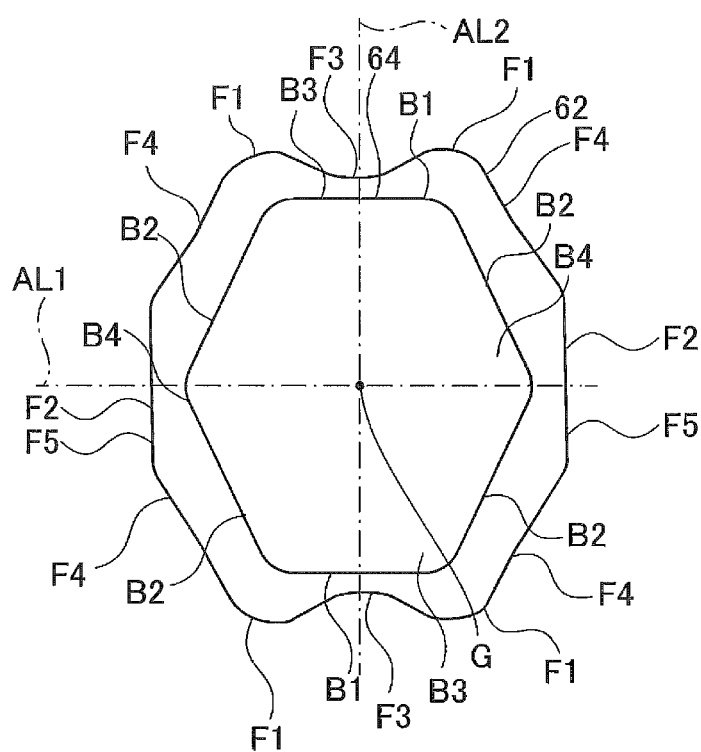
FIG. 5 is a diagram illustrating profile shapes of the lower flange and the body according to an embodiment.

In the present embodiment, as illustrated in FIG. 5, the same number of the portions between protrusion portions and the body linear portions are provided. Preferably, one body linear portion is provided for each portion between protrusion portions. In other words, for each portion between protrusion portions, one body linear portion facing a portion between protrusion portions is preferably provided. However, according to an embodiment, the number of the portions between protrusion portions and the number of the body linear portions are preferably different. In such an embodiment, one body linear portion is preferably provided for each portion between protrusion portions.

In the present embodiment, the flange profile shape 62 of the lower flange 56 includes four or more of the first flange protrusion portions F1 that project in the longitudinal direction L and two of the second flange protrusion portions F2 that project in the lateral direction S. Thus, a plurality of the portions between protrusion portions are disposed at various positions around the outer circumference of the flange profile shape 62. When the portions between protrusion portions rest at the gripping positions of the installing fingers and the installing fingers grip the lower flange 56, a protrusion portion is located on both sides of the portion between protrusion portions along the outer circumference of the flange profile shape 62. Thus, even when the installing fingers come into contact with the protrusion portions, the fingers can slide along the outer circumference of the protrusion portion and be easily guided to the portion between protrusion portions. Thus, the installing fingers can easily grip at a target gripping position of the lower flange. Accordingly, the stud pins 50 can be easily arranged in a target orientation (in a direction around the center axis Z) and stud pins 50 can be installed in a correct orientation with respect to the tire.

In this way, the stud pin 50 of the present embodiment has excellent pin installation properties.

In the present embodiment, the flange profile shape 62 of the lower flange 56 includes four of the first flange protrusion portions F1 and two second flange protrusion portions F2. This increases the braking and driving properties and controllability on icy road surfaces.

Specifically, even when the stud pin 50 receives shear force from an icy road surface, as described below, a gap between the stud pin 50 and the pin inserting hole 29 is not easily formed, and the stud pin 50 is not easily moved out of position in the pin inserting hole 29 (does not come loose). As a result, the stud pin 50 does not easily fall out from the pin inserting hole 29, the shear force between the stud pin 50 and an icy road surface is efficiently transferred to the belt 14, to the entire studded tire 10, and to the vehicle mounted with the studded tire 10. Thus, the braking and driving properties and controllability on icy road surfaces is improved.

In the present embodiment, the flange profile shape 62 of the lower flange 56 includes four of the first flange protrusion portions F1 and two second flange protrusion portions F2. This makes the stud pin 50 harder to fall out from the pin inserting hole 29 of the tire 10 and suppresses the rotation of the stud pin 50 which is an initial cause of the stud pin 50 falling out.

Specifically, the flange profile shape 62 of the lower flange 56 includes the large second flange protrusion portion F2 along the long side 100b. This increases the holding strength to prevent the movement of the stud pin 50 that receives shear force from an icy road surface to incline and fall out from the pin inserting hole. As a result, the stud pin 50 does not easily fall out from the pin inserting hole 29.

In the case of the stud pin 50 falling out from the studded tire, the stud pin 50 falls out while rotating in the hole. In other words, prior to the stud pin 50 falling out from the pin inserting hole 29, the stud pin 50 rotates in the pin inserting hole 29. Typically, when the stud pin 50 receives shearing force from the icy road surface, the stud pin 50 inclines so as to fall against the pin inserting hole 29 in which it is installed. This reduces the fastening force on the stud pin 50 from the hole 29. In this way, the stud pin can easily rotate about the center axis Z in the pin inserting hole 29. Furthermore, when a large shear force is received from the icy road surface, the fastening force of the pin inserting hole 29 decreases, allowing the stud pin 50 to rotate around the center axis Z. When the tire 10 rotates, the resistance of the pin inserting hole 29 and the tread rubber 18 holding the stud pin 50 in the pin inserting hole 29 against the shear force received from an icy road surface is decreased, and the stud pin 50 is more likely to fall out from the pin inserting hole 29. However, the flange profile shape 62 of the lower flange 56 of the stud pin 50 includes four of the first flange protrusion portions F1 and has undulations, and the lower flange 56 is fastened and fixed in the pin inserting hole 29 with the tread rubber 18 deformed corresponding to these undulations. Thus, a gap is not easily formed between the stud pin 50 and the pin inserting holes 29 due to the stud pin 50 inclining in a collapsing direction when the stud pin 50 receives a shear force from an icy road surface. As a result, the lower flange 56 can be tightly fastened by the tread rubber 18 (the inner wall surface of the pin inserting hole), and the rotation of the stud pin 50 in the pin inserting holes 29 which is an initial cause of the stud pin 50 falling out can be suppressed. In order to prevent the stud pin from falling out, a known stud pin including a lower flange with a profile shape with a non-arc shape as described above is configured such that the stud pin does not rotate in the hole. However, the stud pin 50 of the present embodiment can suppress the stud pin 50 from falling out greater than known stud pins with a non-arc shape.

FIG. 5 is a diagram illustrating the flange profile shape 62 of the lower flange 56 according to an embodiment.

According to an embodiment, as illustrated in FIG. 5, the first flange protrusion portion F1 is constituted by two pairs of first flange protrusion portions F1. In other words, when the plane of the paper of FIG. 5 is viewed, two first flange protrusion portions F1 projecting upward in the longitudinal direction L is defined as one pair, and two first flange protrusion portions F1 projecting downward in the longitudinal direction L is defined as the other pair. Here, the body profile shape, as the body linear portion, preferably includes two body linear portions B1 disposed facing the portions of the flange profile shape between the pairs of the first flange protrusion portions F1. Furthermore, four body linear portions B2 are preferably disposed facing the portions of the flange profile shape between each of the second flange protrusion portions F2 and one of the first flange protrusion portions F1.

According to an embodiment, the flange profile shape 62 preferably includes two first flange recess portions F3 that are curved towards the centroid of the flange profile shape 62 and are disposed between each pair of the first flange protrusion portions F1. Here, the flange profile shape 62 preferably includes four second flange recess portions F4 that are curved toward the centroid, are disposed between each of the second flange protrusion portions F2 and one of the first flange protrusion portions F1, and smoothly connect to one of the first flange protrusion portions F1. Here, furthermore, the body linear portions B1 are preferably disposed facing the first flange recess portions F3, and the body linear portions B2 are preferably disposed facing the second flange recess portions F4.

The flange profile shape 62 of the lower flange 56 includes the second flange recess portions F4 at four sections. According, four recesses are formed along the circumference of the flange profile shape 62. Additionally, the flange profile shape 62 of the lower flange 56 includes the first flange recess portions F3 at two sections. According, two recesses are formed along the circumference of the flange profile shape 62. As a result, the installing fingers of a stud pin installation device used in installing the stud pin 50 into the pin inserting hole 29 can more easily grip the lower flange 56 of the stud pin 50. In other words, when the installing fingers grip the lower flange 56 with an anisotropic shape, the stud pin 50 is gripped such that the anisotropic shape takes a suitable orientation and can be installed in the pin inserting hole 29. This improves pin installation properties.

Additionally, the flange profile shape 62 of the lower flange 56 includes the first flange recess portions F3. Thus, when the lower flange 56 comes into contact with the inner wall surface of the pin inserting holes 29, the area of the contact surface in the lateral direction S is increased. This improves the holding strength preventing the movement of the stud pin 50 to fall out of the pin inserting hole 29. As a result, the stud pin 50 can be suppressed from falling out from the pin inserting hole 29.

According to an embodiment, as illustrated in FIG. 5, the two second flange protrusion portions F2 include two flange linear portions F5 parallel with the longitudinal direction L. The flange linear portions F5 are preferably the portions projecting the most in the lateral direction S. With such a configuration, the installing fingers of a stud pin installation device used in installing the stud pin 50 into the pin inserting hole 29 can more easily grip the lower flange 56 of the stud pin 50. For example, in the case of the flange linear portions F5 being at the gripping position of the installing fingers, if the gripping position of the installing fingers strays from the predetermined position along the flange linear portions F5, the range of the flange linear portions F5 which the installing fingers can grip is large allowing the stud pin 50 to be stability gripped. As a result, the number of times the stud pin 50 is incorrectly installed in the pin inserting holes 29 is reduced.

Figure 7A:
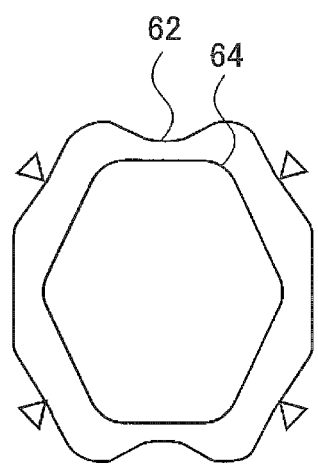
FIGS. 7A to 7D are diagrams illustrating examples of gripping positions of the installing fingers where the lower flange and the body portion with the profile shape illustrated in FIG. 5 is gripped.
Figure 7B:
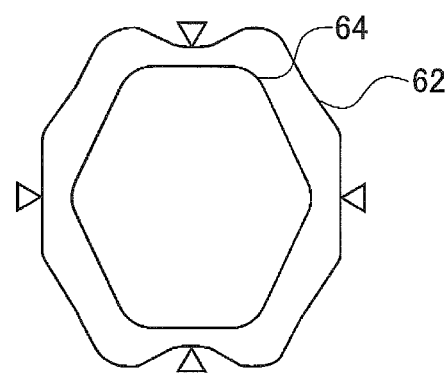
Figure 7C:
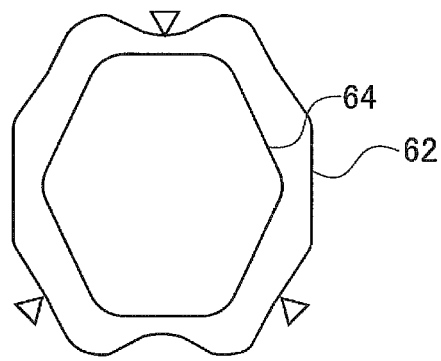
Figure 7D:
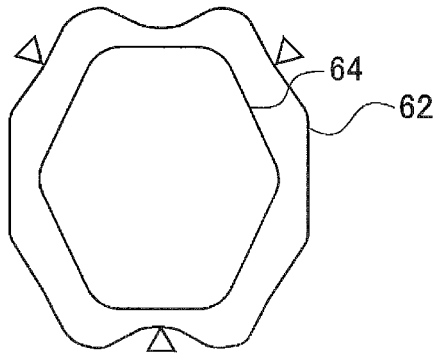

FIGS. 7A to 7D are diagrams illustrating examples of gripping positions of the installing fingers of the stud pin installation device where the lower flange 56 with the flange profile shape 62 illustrated in FIG. 5 is gripped. In FIGS. 7A to 7D, the positions marked with a "A" indicate where the installing fingers grip. FIGS. 7A and 7B illustrate an example in which the installing fingers include four fingers. FIGS. 7C and 7D illustrate an example in which the installing fingers include three fingers. In the examples illustrated in FIGS. 7A to 7D, at least two recess portions are gripping positions, and the other gripping positions correspond to one of the flange linear portions F5 or a recess portion. In this manner, the installing fingers have various modes, including the installing fingers including three or four fingers, allowing it to grip the stud pin 50 at a position of a recess portion of the lower flange 56. Thus, regardless of the type of installing fingers, the stud pin 50 can be stability installed in the pin inserting hole 29.

According to an embodiment, the body portion 54 is preferably encompassed within the profile of the flange profile shape 62 when viewed from the arrangement direction H, and a body profile shape 64 preferably includes two body protrusion portions B4 projecting toward the second flange protrusion portions F2. Here, the body protrusion portions B4 preferably each include two connected body linear portions B2. The two body linear portions B2 that constitute the body protrusion portion B4 are each disposed facing the portion between protrusion portions between the second flange protrusion portion F2 and the first flange protrusion portion F1 (for example, the second flange recess portion F4). Accordingly, in the case that the portion between protrusion portions rests at a gripping position and is gripped by the end portion of the installing finger, even when the gripped stud pin 50 tilts and the upper flange 58 comes into contact with the pad of the installing finger, the upper flange 58 is suppressed from moving and sliding against the pad of the installing finger. This allows the stud pin 50 to be stability gripped. In this embodiment, the second flange protrusion portion F2 is preferably the flange linear portion F5.

According to an embodiment, the body portion 54 is preferably encompassed within the profile of the flange profile shape 62 when viewed from the arrangement direction H, and the body profile shape 64 preferably includes two body protrusion portions B3 projecting toward the short side of the smallest rectangle. Here, the body protrusion portion B3 preferably includes the body linear portion B1, and the body linear portion B1 is preferably the portion projecting the most in the longitudinal direction L. The body linear portions B1 are each disposed facing the portion between protrusion portions between the first flange protrusion portions F1 (for example, the first flange recess portion F3). Accordingly, in the case that the portion between protrusion portions rests at a gripping position and is gripped by the end portion of the installing finger, even when the gripped stud pin 50 tilts and the upper flange 58 comes into contact with the pad of the installing finger, the upper flange 58 is suppressed from moving and sliding against the pad of the installing finger. This allows the stud pin 50 to be gripped in a stable manner.

According to an embodiment, as illustrated in FIG. 5, the two first flange recess portions F3 are preferably formed with a line symmetrical shape about a first imaginary straight line AL1 (see FIG. 5) parallel with the lateral direction S and extending through a centroid G and/or formed with a line symmetrical shape about a second imaginary straight line AL2 (see FIG. 5) parallel with the longitudinal direction L and extending through the centeroid G. In this way, when the stud pin 50 is installed in the pin inserting hole 29, the installing fingers can easily grip the stud pin 50 with a target orientation.

According to an embodiment, as illustrated in FIG. 5, the four second flange recess portions F4 are preferably formed with a line symmetrical shape about a first imaginary straight line AL1 parallel with the lateral direction S and extending through the centroid G and/or formed with a line symmetrical shape about a second imaginary straight line AL2 parallel with the longitudinal direction L and extending through the centroid G. In this way, when the stud pin 50 is installed in the pin inserting hole 29, the installing fingers can easily grip the stud pin 50 with a target orientation.

According to an embodiment, as illustrated in FIG. 5, in the case of the flange profile shape 62 includes two of the flange linear portions F5, the two flange linear portions F5 are preferably formed with a line symmetrical shape about a first imaginary straight line AL1 parallel with the lateral direction S and extending through the centroid G and/or formed with a line symmetrical shape about a second imaginary straight line AL2 parallel with the longitudinal direction L and extending through the centroid G. In this way, when the stud pin 50 is installed in the pin inserting hole 29, the installing fingers can easily grip the stud pin 50 with a target orientation.

Also, according to an embodiment, as illustrated in FIG. 5, the recess depth of the first flange recess portions F3 is preferably the same as the recess depth of the second flange recess portions F4 or greater than the recess depth of the second flange recess portions F4. Here, "recess depth" refers to the distance from a straight line connecting two of the first flange recess portions F3 on either side of the first flange recess portion F3 or the second flange recess portion F4 or a straight line connecting one of the first flange protrusion portions F1 to one of the second flange protrusion portions F2 to a point locate farthest from the first flange recess portion F3 or the second flange recess portion F4. With a shape in which the recess depth is defined as such, the area of the contact surface in the lateral direction S where the lower flange 56 comes into contact with the inner wall surface of the pin inserting hole 29 can be increased, and the recess on the side in the lateral direction S can be enlarged. This allows the rotation of the stud pin 50 to be further suppressed. Furthermore, holding strength to prevent the stud pin 50 from falling out from the pin inserting hole 29 is increased.

According to an embodiment, the curved shape of the first flange recess portions F3 and the curved shape of the second flange recess portions F4 are preferably arc shapes with a set radius of curvature. In the case of the curved shape of the first flange recess portions F3 and the curved shape of the second flange recess portions F4 being formed with a single radius of curvature, the radius of curvature of the first flange recess portions F3 is preferably equal to or less than the radius of curvature of the second flange recess portions F4. For example, to improve the holding strength described above, the radius of curvature of the first flange recess portions F3 is preferably equal to or less than 50% of the radius of curvature of the second flange recess portions F4.

According to an embodiment, as illustrated in FIG. 5, the two second flange protrusion portions F2 include two flange linear portions F5 parallel with the longitudinal direction L. The flange linear portions F5 are preferably the portions projecting the most in the lateral direction S. Also, both ends of the two flange linear portions F5 preferably connect with two of the second flange recess portions F4 of the four second flange recess portions F4. In other words, one second flange protrusion portion F2 is preferably formed by one of the flange linear portions F5 and two of the second flange recess portions F4. In this way, by the lower flange 56 including the second flange protrusion portion F2 projecting greatly in the lateral direction S, the holding strength to prevent the stud pin 50 from falling out from the pin inserting hole 29 is increased.

Figure 8A:
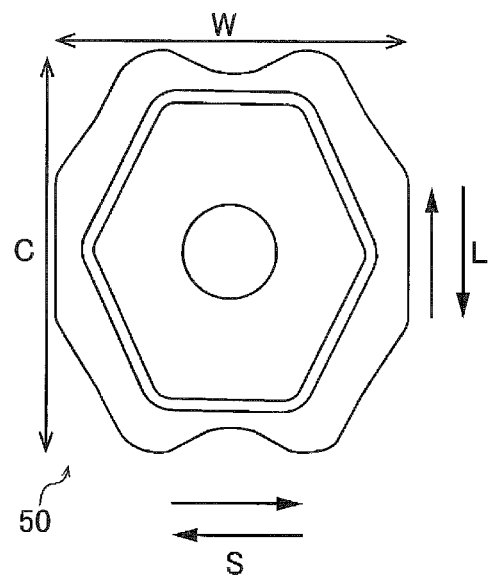
FIGS. 8A and 8B are diagrams illustrating the orientation of the stud pin installed in the tire.
Figure 8B:
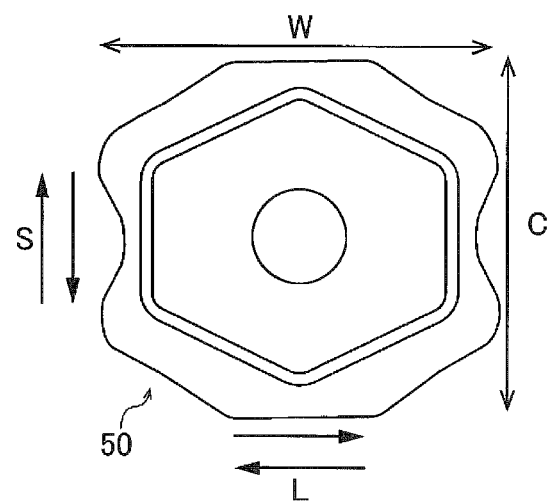

The stud pin 50 including the flange profile shape 62 of the lower flange 56 with an anisotropic shape is installed in a tire. FIGS. 8A and 8B are diagrams illustrating the orientation of the stud pin 50 installed in the tire.

FIG. 8A illustrates an example in which the stud pin is installed in the pin inserting hole 29 with the lateral direction S of the lower flange 56 facing the tire lateral direction W and the longitudinal direction L being aligned with the arrangement direction facing the tire circumferential direction C. FIG. 8B illustrates an example in which the stud pin is installed in the pin inserting hole 29 with the longitudinal direction L of the lower flange 56 facing the tire lateral direction W and the lateral direction S being aligned with the arrangement orientation of the stud pin 50 facing the tire circumferential direction C. Here, "the longitudinal direction L of the lateral direction S of the lower flange 56 facing the tire lateral direction W" refers to the longitudinal direction L or the lateral direction S of the lower flange 56 being inclined with respect to the tire lateral direction W with a predetermined angle range (for example, 15 degrees of less).

As illustrated in FIG. 8A, when the stud pin 50 is disposed with the longitudinal direction L corresponding to the tire circumferential direction C, the stud pin 50 that receives braking force and driving force as sheer force inclines, collapsing in the pin inserting hole 29. However, the lower flange 56 is tightly fastened by the tread rubber 18 formed corresponding to the undulations formed by the four first flange protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire circumferential direction from the icy road surface. As a result, the stud pin 50 does not easily rotate in the pin inserting hole 29. Accordingly, the breaking or accelerating forces are efficiently transferred from the stud pin 50 to the belt 14 via the tread rubber 18, improving the response of the studded tire to braking. In other words, as well as improving the braking ability on ice, the stud pin 50 can be suppressed from falling out from the pin inserting hole 29. Additionally, the second flange recess portion F4 is the portion facing an inclined direction with respect to the tire lateral direction W. Thus, even when breaking or accelerating with a slip angle, if the orientation of the breaking or accelerating force received by the stud pin 50 is inclined, the inner wall surface of the pin inserting hole 29 tightly fastens around the second flange recess portion F4 and the protrusion portions on either side of the second flange recess portion F4 (the first flange protrusion portions F1 and the second flange protrusion portions F2). This improves the response of the studded tire to breaking and accelerating. As described above, the braking and driving properties and pin drop resistance when breaking and driving on icy road surfaces are improved. Furthermore, the flange profile shape 62 of the lower flange 56 includes the large second flange protrusion portion F2 facing the tire lateral direction W. This increases the holding strength to prevent the movement of the stud pin 50 to incline and fall out from the pin inserting hole when the stud pin 50 receives a large lateral force when turning. As a result, controllability on icy road surfaces is improved, as well as pin drop resistance when turning.

As illustrated in FIG. 8B, when the stud pin 50 is disposed with the lateral direction S corresponding to the tire circumferential direction C, the stud pin 50 that receives a lateral force as sheer force inclines, collapsing in the pin inserting hole 29. However, the lower flange 56 is tightly fastened by the tread rubber 18 formed corresponding to the undulations formed by the four first flange protrusion portions F1 of the lower flange 56 at the inner wall surface of the pin inserting hole 29. Thus, a gap is not easily formed (does not come loose) between the stud pin 50 and the pin inserting hole 29 due to the stud pin 50 inclining in the tire lateral direction W. As a result, the stud pin 50 does not easily rotate in the pin inserting hole 29. Accordingly, the lateral force is efficiently transferred from the stud pin 50 to the belt 14 via the tread rubber 18, improving the response of the studded tire to lateral forces. This also suppresses the stud pin 50 from falling out from the pin inserting hole 29. Additionally, the second flange recess portion F4 is the portion facing an inclined direction with respect to the tire lateral direction W. Thus, even when turning with braking/driving engaged, if the orientation of the lateral force received by the stud pin 50 is inclined, the inner wall surface of the pin inserting hole 29 fastens around the protrusion portions (the first flange protrusion portions F1 and the second flange protrusion portions F2) on either side of the second flange recess portion F4 and the second flange recess portion F4. This improves the response of the studded tire to lateral forces. As described above, the controllability and pin drop resistance when turning on icy road surfaces are improved. Furthermore, the flange profile shape 62 of the lower flange 56 includes the large second flange protrusion portion F2 facing the tire circumferential direction C. This increases the holding strength to prevent the movement of the stud pin 50 to incline and fall out from the pin inserting hole when the stud pin 50 receives a large breaking or accelerating force when breaking or driving. As a result, braking and driving properties on icy road surfaces is improved, as well as pin drop resistance when breaking or driving.

In this way, the orientation of the stud pin 50 can be set in accordance with the target characteristics of the studded tire.

Additionally, according to an embodiment, the orientation of the stud pin 50 installed in an inner region near the tire equator line CL of the tread portion is preferably set as the orientation illustrated in FIG. 8A or FIG. 8B, and the orientation of the stud pin 50 installed in an outer region outward from the inner region in the tire lateral direction is preferably set as the orientation illustrated in the other FIG. 8A or FIG. 8B. The degree of the effect on braking and driving properties and controllability depends on the position on the tread portion in the tire lateral direction. Thus, to efficiently improve braking and driving properties and controllability, the orientation of the stud pin 50 illustrated in FIG. 8A or FIG. 8B is preferably selectively selected depending on the position in the tire lateral direction where the stud pin 50 is installed.

EXAMPLES, CONVENTIONAL EXAMPLE, AND COMPARATIVE EXAMPLES

Stud pins including lower flanges with different flange profile shapes and body portions with different body profile shapes were manufactured. The manufactured stud pins were embedded in tires 10 with the configuration illustrated in FIGS. 1 to 3 to manufacture studded tire. These studded tires were mounted to a passenger vehicle test vehicle, and the stud pins were evaluated.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels. The evaluation items for the stud pins are as follows.
Pin Installation Stability Stud pins were gripped by installing fingers of a stud pin installation device and installed in a tire. The percentage of stud pins correctly installed in the pin inserting holes 29 was found. In Comparative Examples 3 to 7 and Examples 1 to 3, the stud pins were installed with a target of having the longitudinal direction of the lower flange facing the tire circumferential direction. In Conventional Example and Comparative Examples 1 and 2, the stud pins were installed with a target of having a preset orientation of the lower flange facing the tire circumferential direction. The stud pins were embedded at an angle with respect to the pin inserting holes 29 (embedded at an angle beyond the predetermined angle range described above), and the number of times the stud pins failed to embed in the pin inserting holes 29 was taken as the number of failures. The percentage (%) of the number of failures to the total number of times the stud pin was installed in the tire was subtracted from 100%, and this value was taken as the pin installation stability. A pin installation stability (%) of 95% or greater indicates excellent pin installation stability.
Braking Ability on Ice The test vehicle was driven on an icy road surface, and the travel distance taken upon engaging braking for the test vehicle to go from a speed of 30 km/h to 5 km/h was measured as the braking distance. The reciprocal of the braking distance for each of the examples are expressed as index values, with the reciprocal of the braking distance of the Conventional Example described below being assigned as the reference (index value of 100). Larger index values indicate shorter braking distance and superior braking ability on ice.

Controllability on Ice

Two evaluator drivers drove the test vehicle on an icy road surface of a conditioned closed course and performed a subjective evaluation of controllability. The two scores were averaged and expressed as index values with the score of the Conventional Example being assigned as the reference (index value of 100). Larger index values indicate superior controllability on ice.

Tables 1 and 2 show the various parameters and evaluation results of the Conventional Example, Comparative Examples, and Examples.

"Shape of first and second smallest rectangle circumscribing profile shape" in Tables 1 and 2 refers to the shape of either the first or second smallest rectangle illustrated in FIG. 4B. For the Conventional Example, "circle" refers to the flange profile shape of the lower flange and not the shape of the first and second smallest rectangle. For Comparative Examples 3 and 4 and the Examples, the ratio of the length of the short side to the length of the long side of the "rectangle" is 1:1.13.

In the "protrusion number (first flange protrusion portion F1, second flange protrusion portion F2)" in Tables 1 and 2, in the case of the number of first flange protrusion portions F1 being even, the number protruding in the direction on both sides in the longitudinal direction was the same. The number of the second flange protrusions F2 was even in all cases, and the number protruding in the direction on both sides in the lateral direction was the same. When the number of the first flange protrusion portions F1 is three, the number protruding in the direction on both sides of the longitudinal direction was 2 and 1, and when the number of first flange protrusion portions F1 is 5, the number protruding in the direction on both sides in the longitudinal direction was 3 and 2.

"Arrangement of body linear portion" in Table 2 refers to whether the body linear portion of the body profile shape is disposed facing a portion between protrusion portions of the flange profile shape. "Not facing" means that all body linear portions do not face a portion between protrusion portions. "Some facing" means that, as in Comparative Example 7, of the four body linear portions, two body linear portions face in the lateral direction and face portions between protrusion portions, and the two remaining body linear portions face in the longitudinal direction and do not face a portion between protrusion portions. "Facing" means that all body linear portions face a portion between protrusion portions. Note that in Example 2, in which the number of the first flange protrusion portions F1 is five, the body linear portions facing two of the portions between protrusion portions on the side where the protruding number is three is considered as one common linear portion.

TABLE 1

|  | Conventional Example | Comparative Example 1 | Comparative Example 2 |
| --- | --- | --- | --- |
| Shape of first and second smallest rectangle circumscribing profile shape | Circle | Square | Square |
| Protrusion number (first flange protrusion portion F1, second flange protrusion portion F2) | — | 2, 2 | 4, 2 |
| Flange linear portion F5 | — | Yes | Yes |
| Body profile shape | Circle | Circle | Circle |
| Pin installation stability (%) | 30 | 80 | 93 |
| Braking ability on ice | 100 | 101 | 102 |
| Controllability on ice | 100 | 102 | 103 |

|  | Comparative Example 3 | Comparative Example 4 | Comparative Example 5 |
| --- | --- | --- | --- |
| Shape of first and second smallest rectangle circumscribing profile shape | Rectangle | Rectangle | Rectangle |
| Protrusion number (first flange protrusion portion F1, second flange protrusion portion F2) | 3, 2 | 2, 4 | 4, 2 |
| Flange linear portion F5 | Yes | Yes | Yes |
| Body profile shape | Circle | Circle | Circle |
| Pin installation stability (%) | 90 | 91 | 93 |
| Braking ability on ice | 102 | 102 | 104 |
| Controllability on ice | 104 | 102 | 106 |

TABLE 2

|  | Comparative Example 6 | Comparative Example 7 |
| --- | --- | --- |
| Shape of first and second smallest rectangle circumscribing profile shape | Rectangle | Rectangle |
| Protrusion number (first flange protrusion portion F1, second flange protrusion portion F2) | 4, 2 | 4, 2 |
| Flange linear portion F5 | Yes | Yes |
| Body profile shape | Hexagon | Quadrilateral |
| Arrangement of body linear portion | Not facing | Some facing |
| Pin installation stability (%) | 93 | 94 |
| Braking ability on ice | 104 | 104 |
| Controllability on ice | 106 | 106 |

|  | Example 1 | Example 2 | Example 3 |
| --- | --- | --- | --- |
| Shape of first and second smallest rectangle circumscribing profile shape | Rectangle | Rectangle | Rectangle |
| Protrusion number (first flange protrusion portion F1, second flange protrusion portion F2) | 4, 2 | 5, 2 | 4, 2 |
| Flange linear portion F5 | Yes | Yes | No (Protruding arc shape) |
| Body profile shape | Hexagon | Hexagon | Hexagon |
| Arrangement of body linear portion | Facing | Facing | Facing |
| Pin installation stability (%) | 98 | 98 | 96 |
| Braking ability on ice | 104 | 105 | 103 |
| Controllability on ice | 106 | 108 | 104 |

As seen from comparing the Conventional Example, Comparative Examples 1 to 7, and Examples 1 to 3, a configuration in which the flange profile shape 62 of the lower flange 56 has an anisotropic shape with the first smallest rectangle or the second smallest rectangle circumscribing the flange profile shape 62 being a rectangle, the flange profile shape 62 includes four or more first flange protrusion portion F1 projecting toward the longitudinal direction L and two second flange protrusion portions F2 projecting toward the lateral direction S, the body profile shape is a shape including a plurality of body linear portions, and the body linear portion is disposed facing a portion between protrusion portions has excellent braking ability and controllability on icy road surfaces and excellent pin installation properties.

As seen from comparing Example 1 and Example 3, a configuration including the flange linear portion F5 has better pin installation properties.

A stud pin and a studded tire according to an embodiment of the present technology have been described above. However, it should be understood that the present technology is not limited to the above embodiments and examples, and may be improved or modified in various ways so long as these improvements or modifications remain within the scope of the present technology.

The invention claimed is:

1. A stud pin installable in a studdable tire, comprising:
a tip comprising an end surface that comes into contact with a road surface;
a body portion that supports the tip so that the tip projects from an end surface on one side of the body portion; and
a lower flange connected to an end of the body portion on an opposite side to the end surface; wherein
a flange profile shape of the lower flange as viewed from an arrangement direction of the tip, the body portion, and the lower flange is an anisotropic shape in which, of imaginary rectangles circumscribing the flange profile shape, a first smallest rectangle with a shortest side of its four sides being a smallest and/or a second smallest rectangle with a longest side of its four sides being a smallest comprise short sides and long sides of different lengths;
the flange profile shape comprises four or more first flange protrusion portions that project toward a longitudinal direction parallel with the long sides and two second flange protrusion portions that project toward a lateral direction parallel with the short sides;
a body profile shape of the body portion as viewed from the arrangement direction is a shape comprising body linear portions extending in a linear manner;
the body linear portions are disposed facing a portion of the flange profile shape along an outer circumference of the flange profile shape between two adjacent protrusion portions of the first flange protrusion portions;
the first flange protrusion portions are constituted by two pairs of the first flange protrusion portions;
the flange profile shape comprises two first flange recess portions curved toward a centroid of the flange profile shape and disposed between each of the pairs of the first flange protrusion portions and at least one second flange recess portion curved toward the centroid, disposed between each of the second flange protrusion portions and one of the first flange protrusion portions, and smoothly connect to one of the first flange protrusion portions; and
a radius of curvature of the first recess portions is smaller than a radius of curvature of the at least one second flange recess portion.

2. The stud pin according to claim 1, wherein
the body profile shape comprises, as the body linear portions, two first body linear portions disposed facing a portion of the flange profile shape between each of the two pairs of the first flange protrusion portions and four second body linear portions disposed facing a portion of the flange profile shape between each of the second flange protrusion portions and one of the first flange protrusion portions.

3. The stud pin according to claim 2, wherein
the at least one second flange recess portion of the flange profile shape comprises four second flange recess portions; and
the first body linear portions are disposed facing the first flange recess portions, and the second body linear portions are disposed facing the four second flange recess portions.

4. The stud pin according to claim 3, wherein
the two second flange protrusion portions comprise two flange linear portions parallel with the longitudinal direction; and
the flange linear portions are portions projecting most in the lateral direction.

5. The stud pin according to claim 4, wherein
the body portion is encompassed within the flange profile shape when viewed from the arrangement direction;
the body profile shape comprises two body protrusion portions projecting toward the second flange protrusion portions; and
the body protrusion portions each comprises two of the second body linear portions connected together.

6. The stud pin according to claim 5, wherein
the body portion is encompassed within the flange profile shape when viewed from the arrangement direction;
the body profile shape comprises two body protrusion portions projecting toward the short sides of the smallest rectangle;
the body protrusion portions comprise the first body linear portions; and
the first body linear portions are portions projecting most in a longitudinal direction parallel with the long sides of the smallest rectangle.

7. A studded tire that is a studdable tire installed with a stud pin, comprising:
a tread portion installed with the stud pin described in claim 6 with the longitudinal direction or the lateral direction facing a tire circumferential direction.

8. The stud pin according to claim 2, wherein
the body portion is encompassed within the flange profile shape when viewed from the arrangement direction;
the body profile shape comprises two body protrusion portions projecting toward the second flange protrusion portions; and
the body protrusion portions each comprises two of the second body linear portions connected together.

9. The stud pin according to claim 2, wherein
the body portion is encompassed within the flange profile shape when viewed from the arrangement direction;
the body profile shape comprises two body protrusion portions projecting toward the short sides of the smallest rectangle;
the body protrusion portions comprise the first body linear portions; and
the first body linear portions are portions projecting most in a longitudinal direction parallel with the long sides of the smallest rectangle.

10. The stud pin according to claim 1, wherein
the two second flange protrusion portions comprise two flange linear portions parallel with the longitudinal direction; and
the flange linear portions are portions projecting the most in the lateral direction.

11. A studded tire that is a studdable tire installed with a stud pin, comprising:

a tread portion installed with the stud pin described in claim 1 with the longitudinal direction or the lateral direction facing a tire circumferential direction.

* * * * *